United States Patent
Khoshnevisan et al.

(10) Patent No.: US 10,405,190 B2
(45) Date of Patent: Sep. 3, 2019

(54) CHANNEL ASSIGNMENT IN SHARED SPECTRUM BASED ON NETWORK COVERAGE OVERLAP AND NETWORK WEIGHTS

(71) Applicant: QUALCOMM Incorporated, San Diego, CA (US)

(72) Inventors: Mostafa Khoshnevisan, San Diego, CA (US); Farhad Meshkati, San Diego, CA (US); Satashu Goel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 15/799,957

(22) Filed: Oct. 31, 2017

(65) Prior Publication Data

US 2018/0132112 A1 May 10, 2018

Related U.S. Application Data

(60) Provisional application No. 62/417,857, filed on Nov. 4, 2016.

(51) Int. Cl.
*H04W 16/14* (2009.01)
*H04W 72/04* (2009.01)
(Continued)

(52) U.S. Cl.
CPC ....... *H04W 16/14* (2013.01); *H04W 72/0453* (2013.01); *H04L 5/0058* (2013.01);
(Continued)

(58) Field of Classification Search
CPC .................................................. H04W 16/14
(Continued)

(56) References Cited

U.S. PATENT DOCUMENTS 7,907,508 B2  3/2011 Tao et al.
9,749,872 B2  8/2017 Zhu et al.
(Continued)

FOREIGN PATENT DOCUMENTS

CN  104038946 A  9/2014

OTHER PUBLICATIONS

Garroppo R.G., et al., "Interference-Aware Channel Assignment in Wireless Mesh Networks", Network and Parallel Computing [Lecture Notes in Computer Science], Springer International Publishing, XP047406664, Jan. 16, 2008 (Jan. 16, 2008), pp. 73-88, ISSN: 0302-9743, ISBN: 978-3-642-01969-2.
(Continued)

*Primary Examiner* — Joel Ajayi
(74) *Attorney, Agent, or Firm* — Patterson & Sheridan, LLP

(57) ABSTRACT

Aspects of the present disclosure relate to methods and apparatus for assigning channels to networks in a group based on network coverage overlap and network weights. An example method generally includes determining whether channels are available for allocation at each network represented by a node in a network overlap graph, wherein each node in the graph is associated with an assigned channel in a shared spectrum, and for each network in the graph for which channels are available for allocation, identifying channels that are available for allocation to the network, and assigning at least one of the available channels to the network based, at least in part, on a weighting associated with the network.

25 Claims, 14 Drawing Sheets

| Addition of Channel | Network 1 | Network 2 | Network 3 | Network 4 | Network 5 | Network 6 | Network 7 |
|---|---|---|---|---|---|---|---|
| Option 1 | C5 | - | - | - | C3,C4,C5 | - | C3,C5 |
| Option 2 | C5 | - | - | - | C3, C5 | C4 | C3,C5 |

1600

(51) Int. Cl.
  *H04W 24/08* (2009.01)
  *H04L 5/00* (2006.01)
  *H04W 72/08* (2009.01)

(52) U.S. Cl.
  CPC .......... *H04W 24/08* (2013.01); *H04W 72/082* (2013.01); *H04W 72/085* (2013.01)

(58) Field of Classification Search
  USPC ......................................................... 370/329
  See application file for complete search history.

(56) References Cited

U.S. PATENT DOCUMENTS

| | | | |
|---|---|---|---|
| 2005/0180329 A1* | 8/2005 | Qiu ....................... | H04L 45/122 370/238 |
| 2009/0010164 A1* | 1/2009 | Wang ................ | H04W 72/0486 370/235 |
| 2010/0110996 A1* | 5/2010 | Tao ....................... | H04W 16/02 370/329 |
| 2015/0079974 A1 | 3/2015 | Farhadi et al. | |
| 2017/0048715 A1 | 2/2017 | Fan et al. | |
| 2017/0188241 A1 | 6/2017 | Mueck et al. | |
| 2017/0290037 A1 | 10/2017 | Goel et al. | |

OTHER PUBLICATIONS

International Search Report and Written Opinion—PCT/US2017/059899—ISA/EPO—dated Jan. 26, 2018.

\* cited by examiner

CHANNEL ASSIGNMENT IN SHARED SPECTRUM BASED ON NETWORK COVERAGE OVERLAP AND NETWORK WEIGHTS

CROSS-REFERENCE TO RELATED APPLICATIONS

This application claims benefit to U.S. Provisional Patent Application Ser. No. 62/417,857, entitled "Channel Assignment in Shared Spectrum Based on Network Coverage Overlap and Network Weights," filed Nov. 4, 2016 and assigned to the assignee hereof, the contents of which are hereby incorporated by reference in its entirety.

BACKGROUND

Field of the Disclosure

Certain aspects of the present disclosure generally relate to wireless communications and, more particularly, to techniques for assigning carriers in a shared spectrum to overlapping networks.

Description of Related Art

Wireless communication systems are widely deployed to provide various types of communication content such as voice, data, video, and the like, and deployments are likely to increase with introduction of new data oriented systems such as Long Term Evolution (LTE) systems. Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and other orthogonal frequency division multiple access (OFDMA) systems.

Generally, a wireless multiple-access communication system can simultaneously support communication for multiple wireless terminals (also known as user equipments (UEs), user terminals, or access terminals (ATs)). Each terminal communicates with one or more base stations (also known as access points (APs), eNodeBs, or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via single-in-single-out, single-in-multiple out, multiple-in-single-out, or multiple-in-multiple-out (MIMO) systems.

Newer multiple access systems, for example, LTE, deliver faster data throughput than older technologies. Faster downlink rates, in turn, have sparked a greater demand for higher-bandwidth content, such as high-resolution graphics and video, for use on or with mobile devices. Therefore, demand for bandwidth on wireless communications systems continues to increase despite availability of higher data throughput over wireless interfaces, and this trend is likely to continue. However, wireless spectrum is a limited and regulated resource. Therefore, new approaches are needed in wireless communications to more fully utilize this limited resource and satisfy consumer demand.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to techniques for assigning carriers in shared spectrum to networks based on network coverage overlap and network weights.

Certain aspects of the present disclosure provide a method of assigning channels to a plurality of networks in a wireless communications environment. The method generally includes determining whether channels are available for allocation at each network represented by a node in a network overlap graph, wherein each node in the graph is associated with an assigned channel in a shared spectrum; and for each network in the graph for which channels are available for allocation, identifying channels that are available for allocation to the network, and assigning at least one of the available channels to the network based, at least in part, on a weighting associated with the network.

Certain aspects of the present disclosure provide an apparatus for assigning channels to a plurality of networks in a wireless communications environment. The apparatus generally includes a processor configured to determine whether channels are available for allocation at each network represented by a node in a network overlap graph, wherein each node in the graph is associated with an assigned channel in a shared spectrum, and for each network in the graph for which channels are available for allocation, identify channels that are available for allocation to the network, and assign at least one of the available channels to the network based, at least in part, on a weighting associated with the network; and a memory coupled to the processor.

Certain aspects of the present disclosure provide an apparatus for assigning channels to a plurality of networks in a wireless communications environment. The apparatus generally includes means for determining whether channels are available for allocation at each network represented by a node in a network overlap graph, wherein each node in the graph is associated with an assigned channel in a shared spectrum; and for each network in the graph for which channels are available for allocation, means for identifying channels that are available for allocation to the network, and means for assigning at least one of the available channels to the network based, at least in part, on a weighting associated with the network.

Certain aspects of the present disclosure provide a computer-readable medium having instructions stored thereon for assigning channels to a plurality of networks in a wireless communications environment. When executed, the instructions generally cause one or more processors to determine whether channels are available for allocation at each network represented by a node in a network overlap graph, wherein each node in the graph is associated with an assigned channel in a shared spectrum; and for each network in the graph for which channels are available for allocation, identify channels that are available for allocation to the network, and assign at least one of the available channels to the network based, at least in part, on a weighting associated with the network Numerous other aspects are provided including methods, apparatus, systems, computer program products, computer-readable medium, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
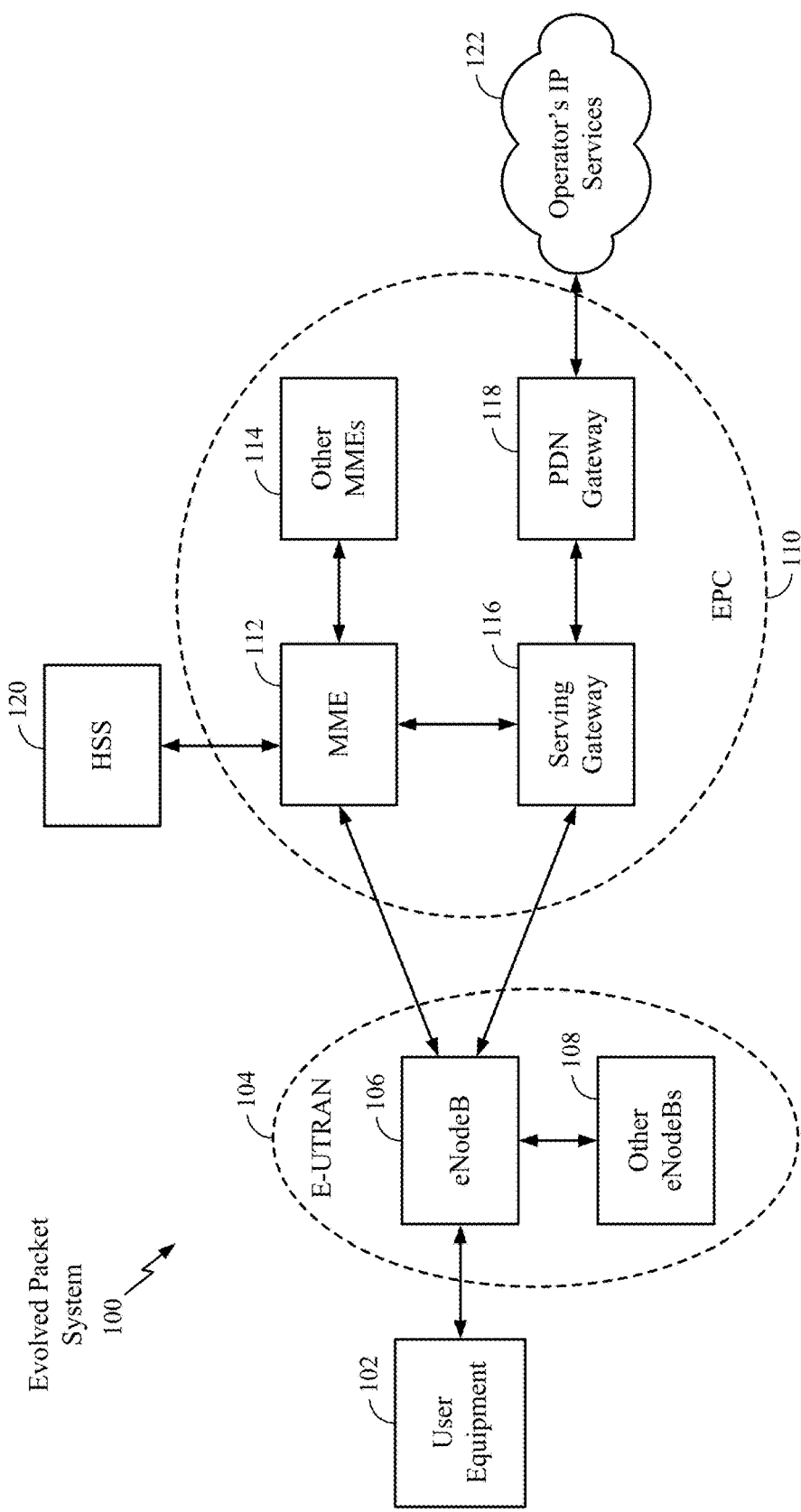
FIG. 1 is a diagram illustrating an example of a network architecture, in accordance with certain aspects of the disclosure.

Aspects of the present disclosure provide techniques for assigning channels to networks (e.g., network operators) co-existing in the same spectrum, for example, the 3.5 GHz spectrum, and that may be subject to interference limitations with respect to other networks in the same spectrum. For example, aspects of the present disclosure provide techniques for assigning unused channels, non-interfering channels to different networks co-existing in the same spectrum based on a network coverage graph and a network weight. By assigning channels to different networks based on a coverage graph and network weight, overlapping networks may receive allocations of additional channels that may allow, for example, more highly loaded networks to provide additional bandwidth to serve devices connected to those networks.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, wearables (e.g., smart watch, smart bracelet, smart glasses, smart ring, smart clothing), etc.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may use time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g., sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer-readable medium for execution on a processor or computer. Furthermore, an aspect may comprise at least one element of a claim.

It is noted that while aspects may be described herein using terminology commonly associated with 3G and/or 4G wireless technologies, aspects of the present disclosure can be applied in other generation-based communication systems, such as 5G and later.

An Example Wireless Communications System

FIG. 1 is a diagram illustrating an LTE network architecture 100 in which aspects of the present disclosure may be practiced. For example, a core network entity (not shown) may determine coverage contour and interference thresholds for networks operating in a wireless communications environment so as to optimally reduce interference seen in these networks while maintaining an acceptable channel throughput (e.g., bandwidth).

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
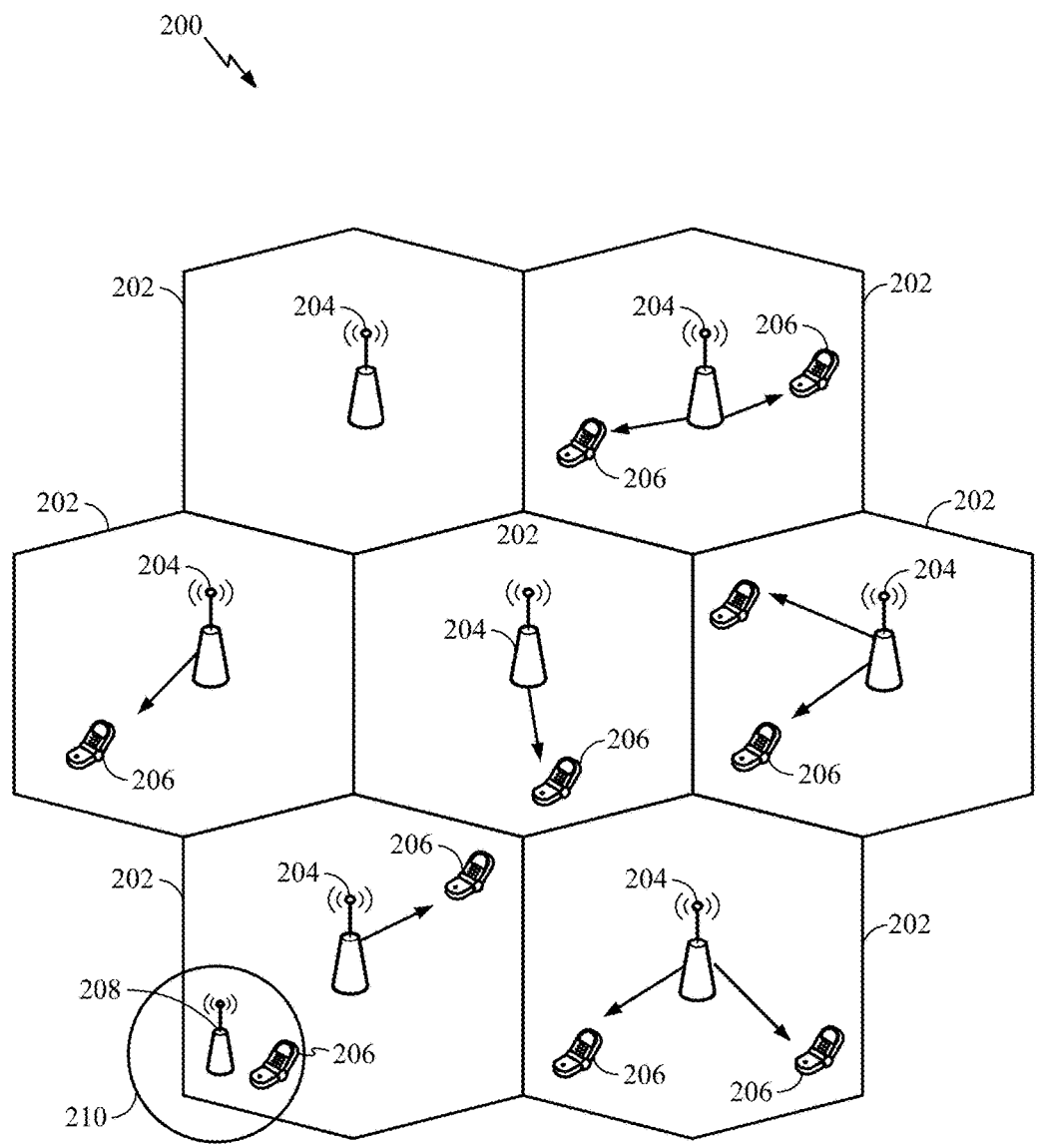
FIG. 2 is a diagram illustrating an example of an access network, in accordance with certain aspects of the disclosure.

FIG. 2 is a diagram illustrating an example of an access network 200 in an LTE network architecture in which aspects of the present disclosure may be practiced. For example, a core network entity (not shown) may determine coverage contour and interference thresholds for the access network 200 operating in a wireless communications environment so as to optimally reduce interference seen in the access network 200 (e.g., caused by other networks in the wireless communications environment) while maintaining an acceptable channel throughput (e.g., bandwidth) for the access network 200.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
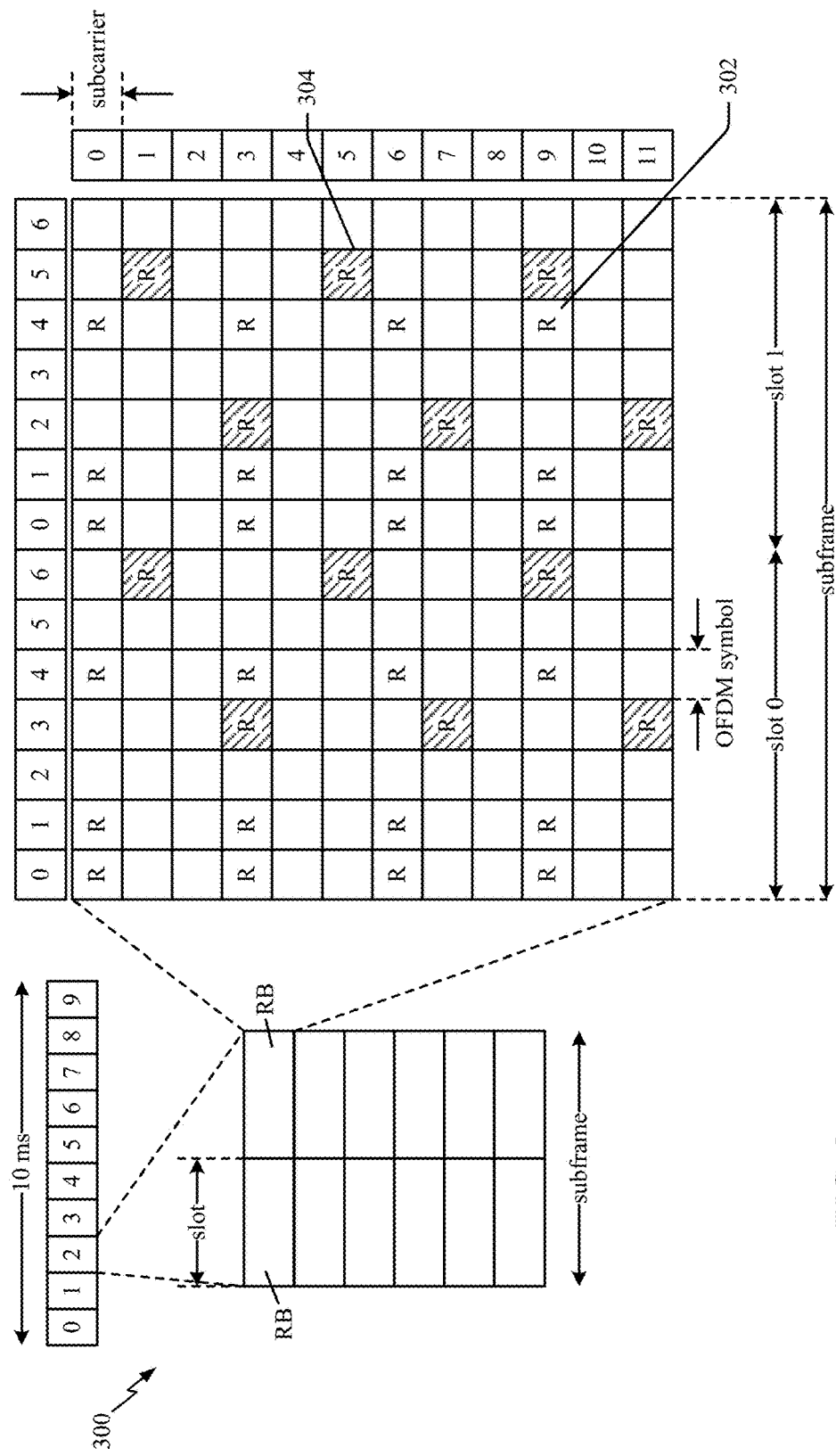
FIG. 3 is a diagram illustrating an example of a DL frame structure in LTE, in accordance with certain aspects of the disclosure.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
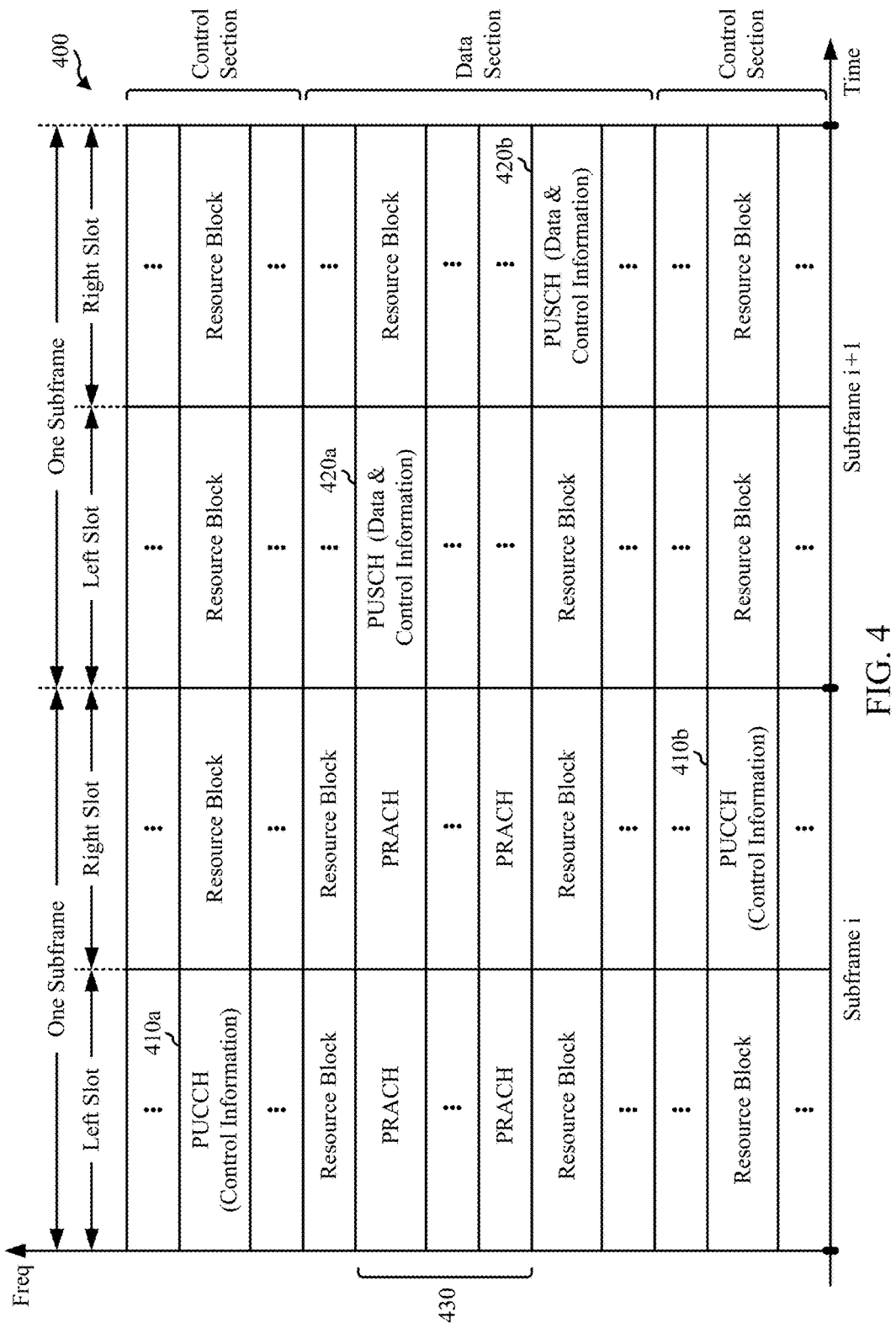
FIG. 4 is a diagram illustrating an example of an UL frame structure in LTE, in accordance with certain aspects of the disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
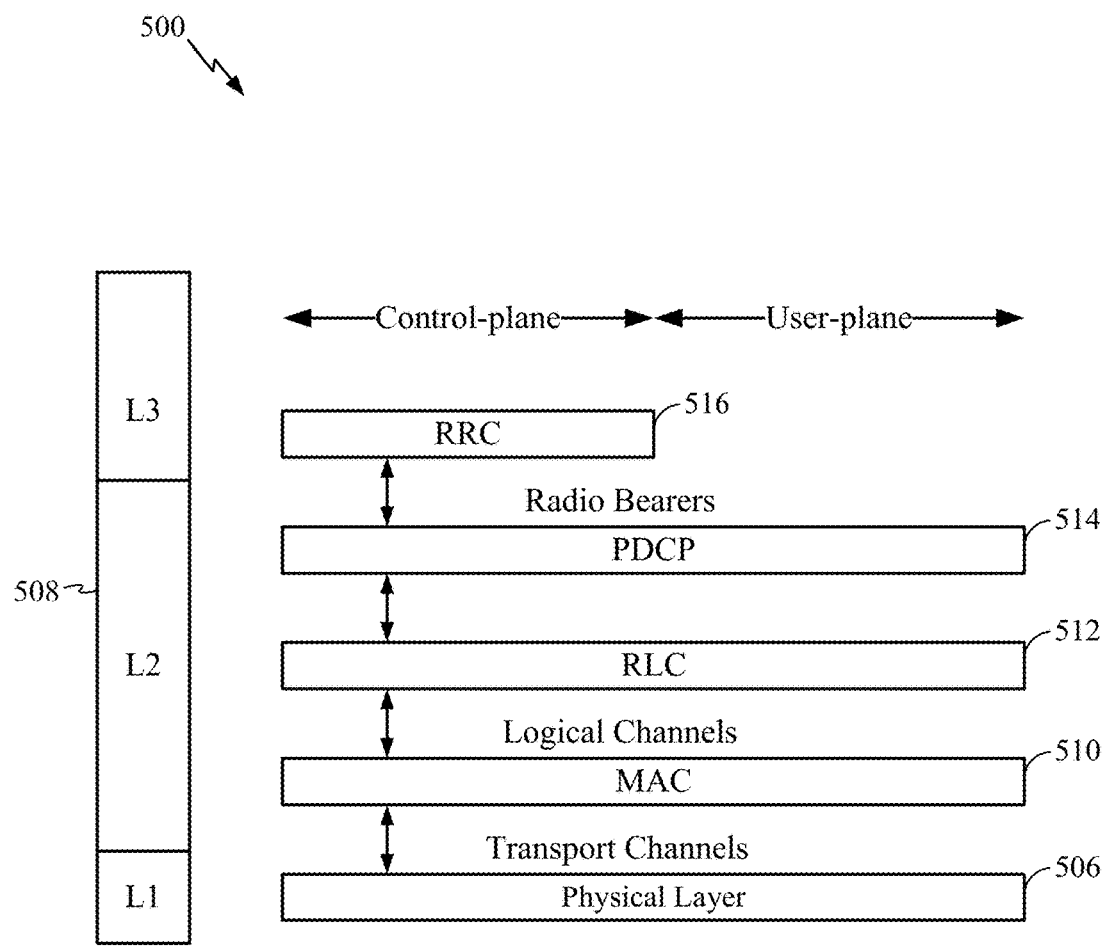
FIG. 5 is a diagram illustrating an example of a radio protocol architecture for the user and control plane, in accordance with certain aspects of the disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
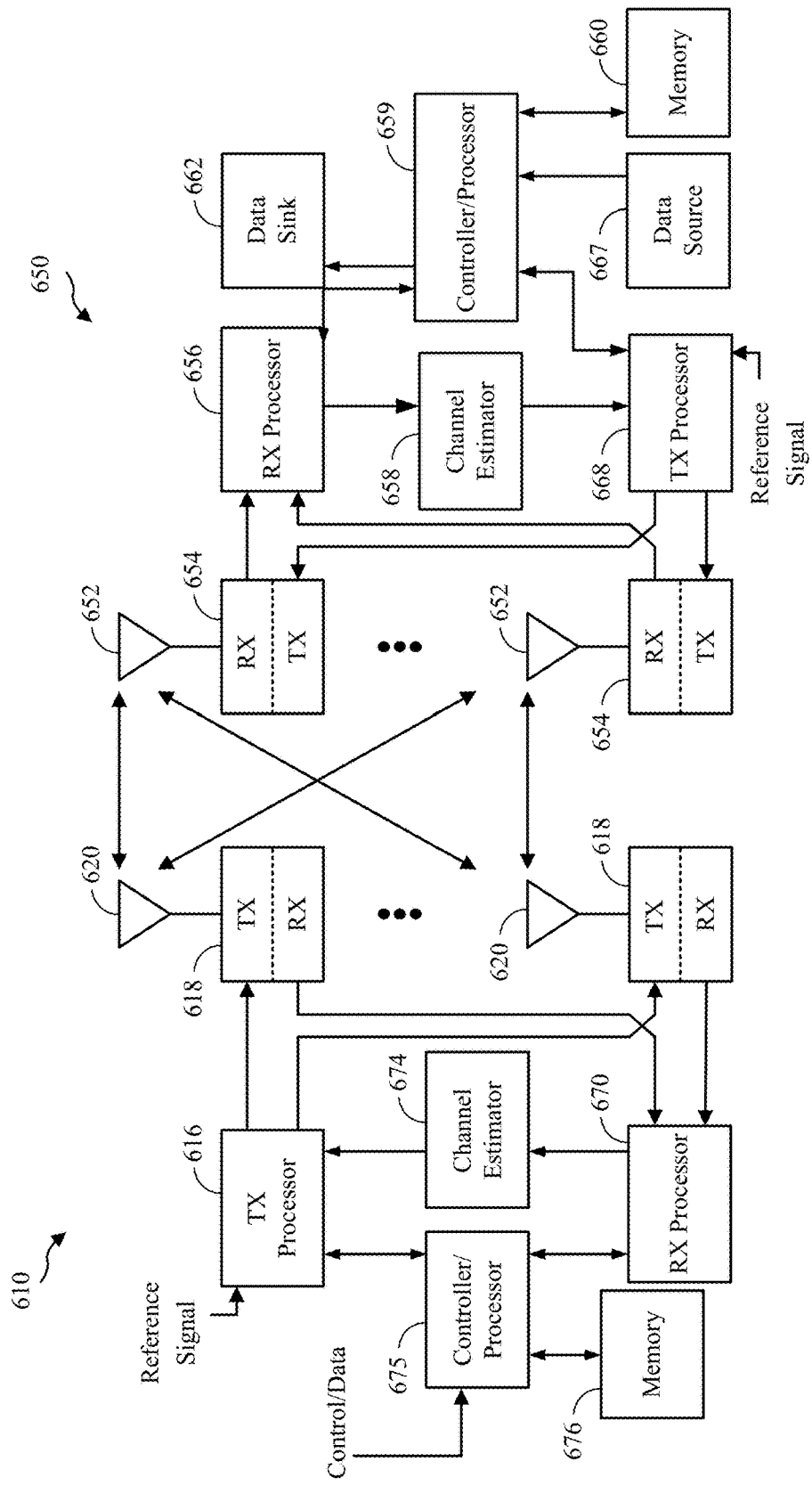
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced. For example, a central entity (not shown) may evaluate an amount of transmission limitation imposed on each pair of channel and group of eNBs (e.g., eNBs 610) assigned to the respective channel. The central entity may assign a channel to each group of eNBs based on the evaluation. It may be noted that the central entity may be implemented by eNB 610 or UE 650.

In the DL, upper layer packets from the core network are provided to a controller/processor 675. The controller/processor 675 implements the functionality of the L2 layer, for example. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer), for example. The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer, for example. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer, for example. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659, for example. The data source 667 represents all protocol layers above the L2 layer, for example. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610, for example. The controller/processor 659 is also responsible for HARQ operations, retransmission of lost packets, and signaling to the eNB 610, for example.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer, for example.

The controller/processor 675 implements the L2 layer, for example. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 11:
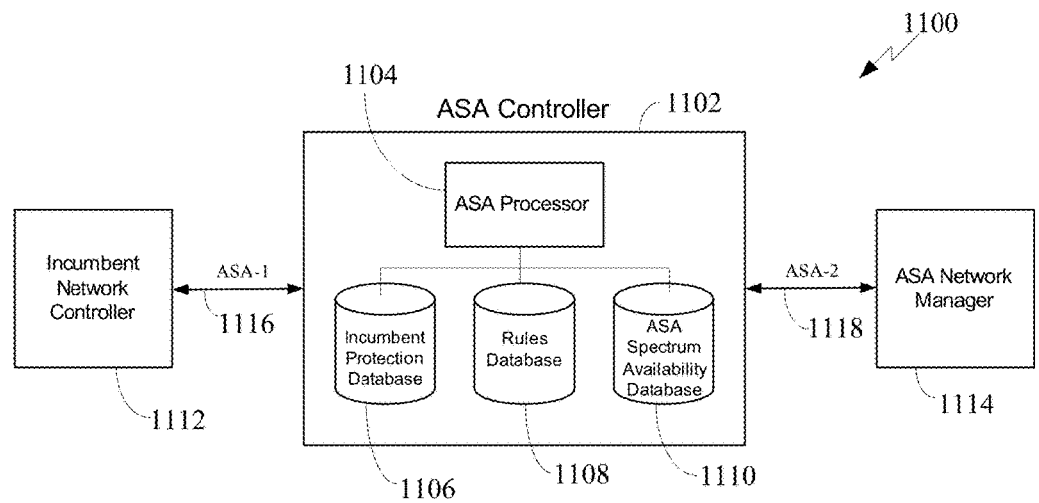
FIG. 11 is a block diagram showing aspects of an Authorized Shared Access (ASA) controller coupled to different wireless communication systems including one primary user and one secondary user, in accordance with certain aspects of the disclosure.

The controller/processor 675 and/or other processors, components and/or modules at the eNB 610 or the controller/processor 659 and/or other processors, components and/or modules at the UE 650 may perform or direct operations, for example, operations 1100 in FIG. 11, and/or other processes for the techniques described herein for assigning channels to groups of devices sharing bandwidth in presence of incumbent devices. In certain aspects, one or more of any of the components shown in FIG. 6 may be employed to perform example operations 1100, and/or other processes for the techniques described herein. The memories 660 and 676 may store data and program codes for the UE 650 and eNB 610 respectively, accessible and executable by one or more other components of the UE 650 and the eNB 610.

Example New Radio (Nr)/5G Radio Access Network Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 75 kHz over a 0.1 ms duration or a bandwidth of 15 kHz over a 1 ms duration. Each radio frame may consist of 10 or 50 subframes with a length of 10 ms. Each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases, DCells may not transmit synchronization signals (SS)—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
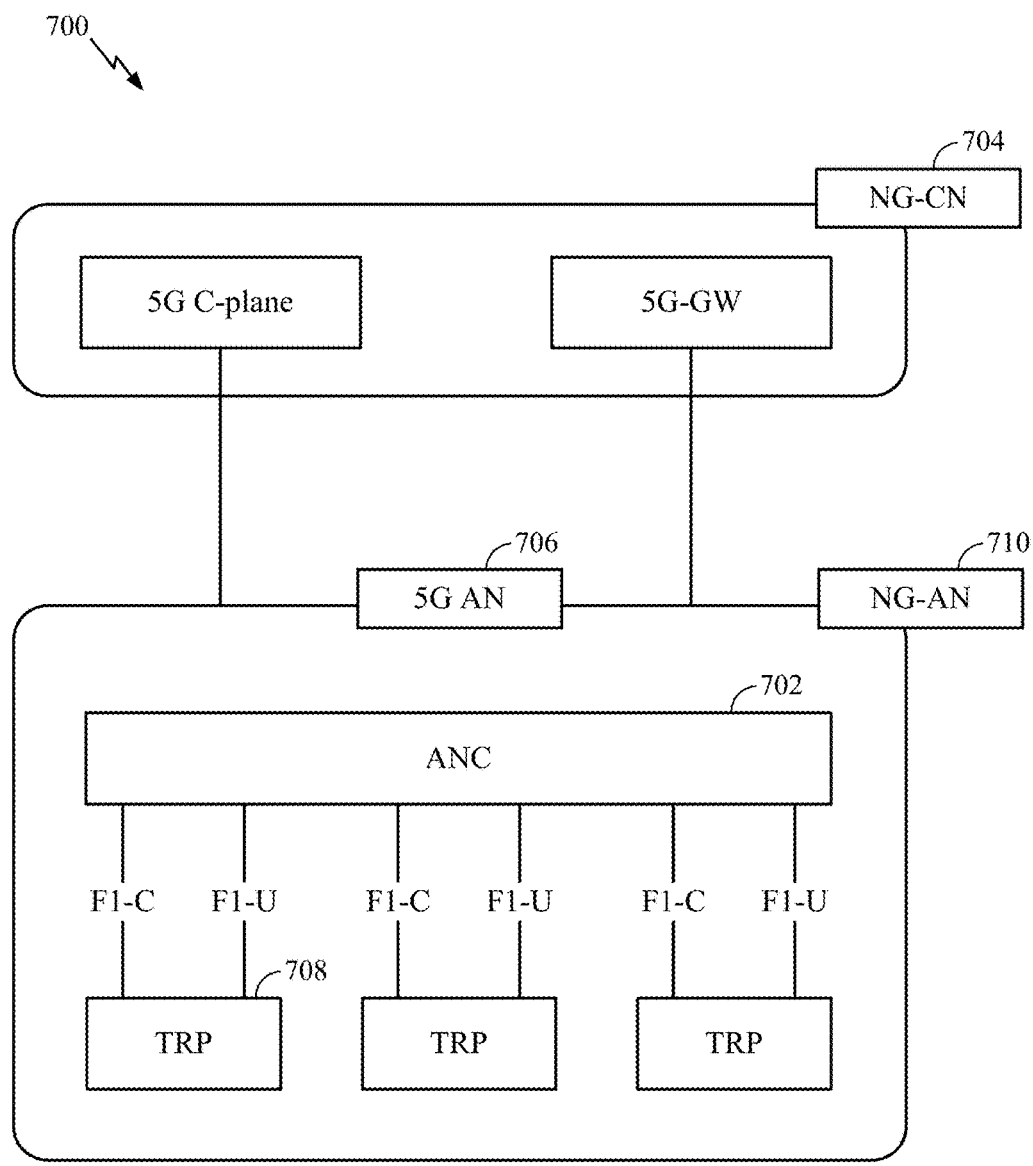
FIG. 7 illustrates an example logical architecture of a distributed radio access network (RAN), in accordance with certain aspects of the present disclosure.

FIG. 7 illustrates an example logical architecture of a distributed RAN 700, according to aspects of the present disclosure. A 5G access node 706 may include an access node controller (ANC) 702. The ANC may be a central unit (CU) of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5G NBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 700 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture 700. The PDCP, RLC, MAC protocol may be adaptably placed at the ANC or TRP.

Figure 8:
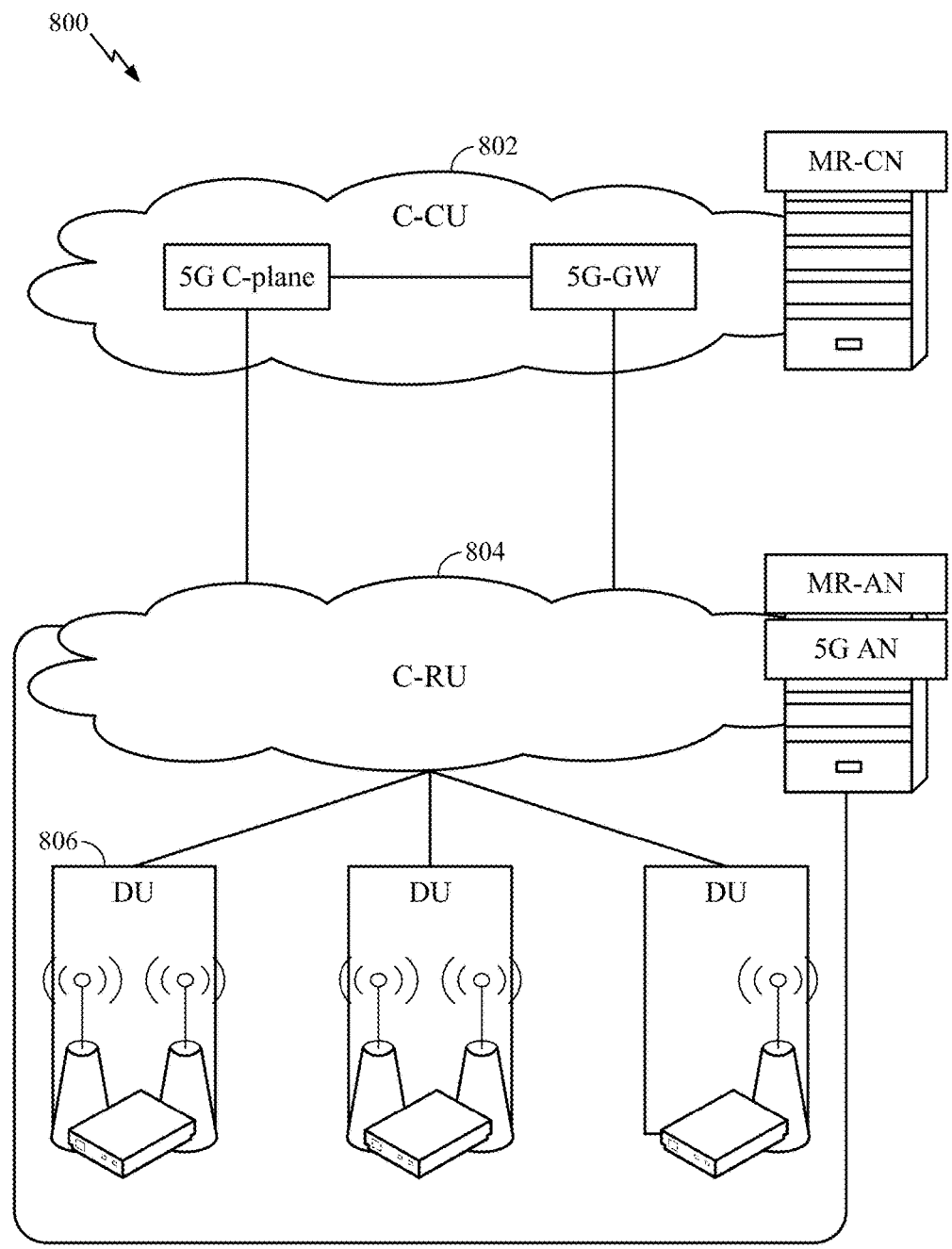
FIG. 8 illustrates an example physical architecture of a distributed RAN, in accordance with certain aspects of the present disclosure.

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity. A centralized RAN unit (C-RU) 804 may host one or more ANC functions. Optionally, the C-RU may host core network functions locally. The C-RU may have distributed deployment. The C-RU may be closer to the network edge. A distributed unit (DU) 806 may host one or more TRPs. The DU may be located at edges of the network with radio frequency (RF) functionality.

Figure 9:
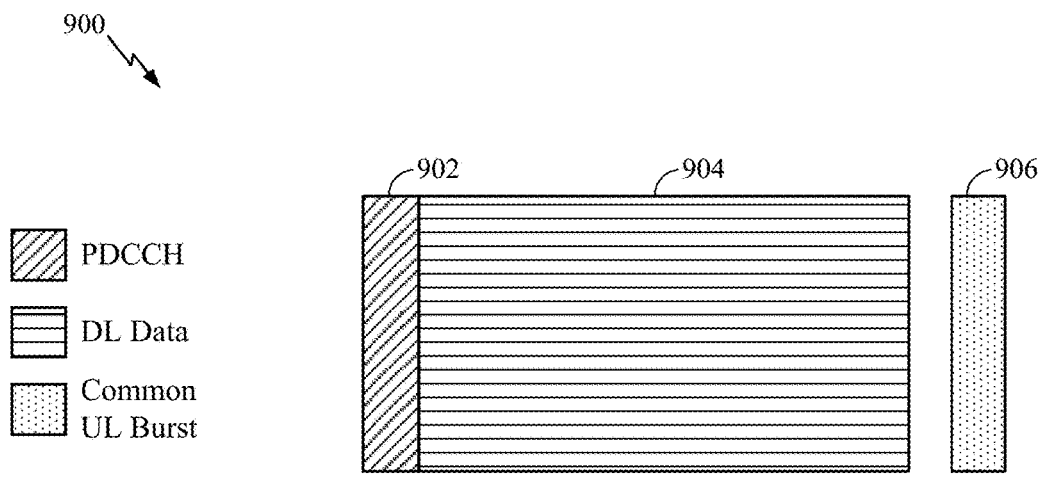
FIG. 9 is a diagram illustrating an example of a downlink (DL)-centric subframe, in accordance with certain aspects of the present disclosure.

FIG. 9 is a diagram 900 showing an example of a DL-centric subframe. The DL-centric subframe may include a control portion 902. The control portion 902 may exist in the initial or beginning portion of the DL-centric subframe. The control portion 802 may include various scheduling information and/or control information corresponding to various portions of the DL-centric subframe. In some configurations, the control portion 902 may be a physical DL control channel (PDCCH), as indicated in FIG. 8. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a physical DL shared channel (PDSCH).

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information. As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
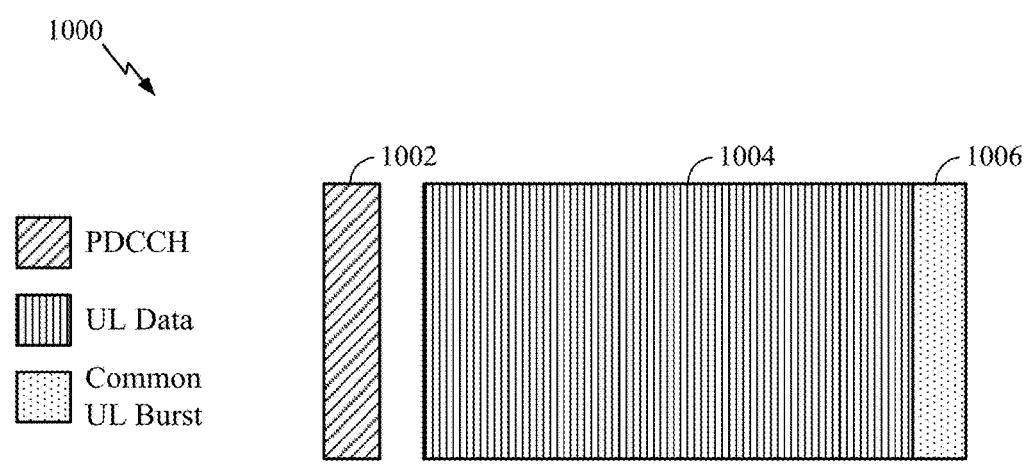
FIG. 10 is a diagram illustrating an example of an uplink (UL)-centric subframe, in accordance with certain aspects of the present disclosure.

FIG. 10 is a diagram 1000 showing an example of an UL-centric subframe. The UL-centric subframe may include a control portion 1002. The control portion 1002 may exist in the initial or beginning portion of the UL-centric subframe. The control portion 1002 in FIG. 10 may be similar to the control portion 1002 described above with reference to FIG. 10. The UL-centric subframe may also include an UL data portion 1004. The UL data portion 1004 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 1002 may be a physical DL control channel (PDCCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 1006 described above with reference to FIG. 10. The common UL portion 1006 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Authorized Shared Access for 3.5 GHz

Due to the explosive growth in mobile broadband traffic and its concomitant strain on limited spectrum resources, the Federal Communications Commission has adopted rules to allow commercial shared use of 150 MHz of spectrum in the 3550-3700 MHz (3.5 GHz) band for licensed and unlicensed use of the 3.5 GHz band for a wide variety of services.

Figure 14:
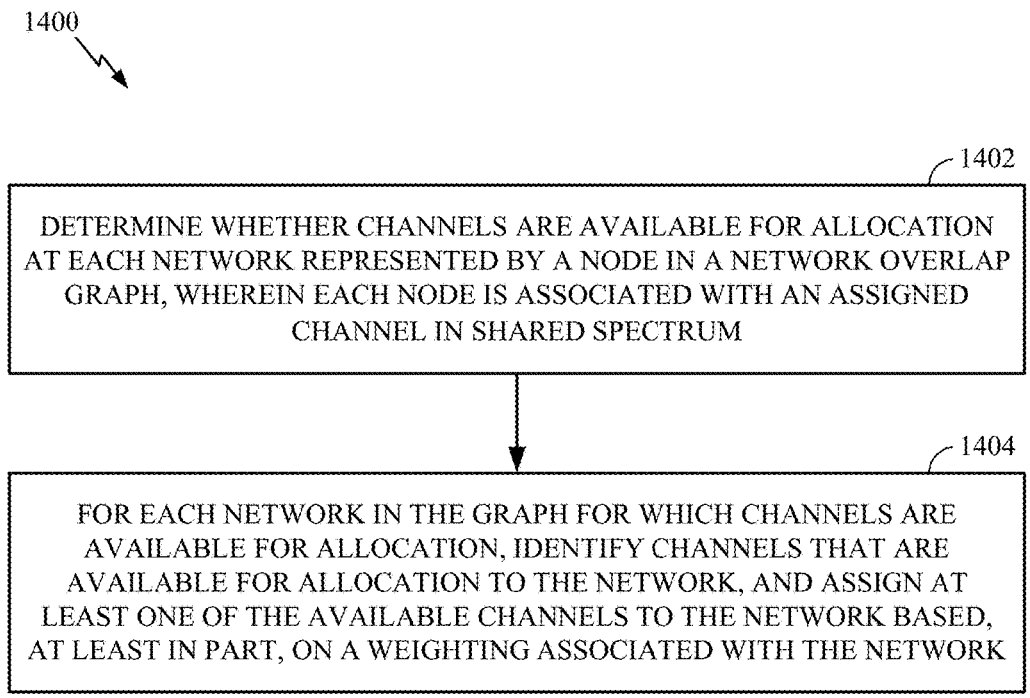
FIG. 14 illustrates example operations for assigning channels to a plurality of networks in a wireless communications environment, in accordance with certain aspects of the present disclosure.

Citizens Broadband Radio service (CBRS) is a tiered commercial radio service in 3.5 GHz in the U.S. A Spectrum Access System (SAS) may allocate channels within and across tiers, for example, according to aspects presented here (e.g., with reference to operations 1400 illustrated in FIG. 14). These tiers can include, in order of priority, (1) incumbent licensees; (2) Priority Access licensees (PALs); and (3) General Authorized Access (GAA) operators.

Authorized shared access (ASA) allocates, to a secondary user(s), portions of spectrum that are not continuously used by an incumbent system(s). The incumbent system may be referred to as an incumbent licensee, Tier 1 operator, primary licensee, or a primary user that is given a primary license for a band of frequencies. The incumbent system may not use the entire frequency band in all locations and/or at all times. The secondary user may be referred to as a secondary licensee or a secondary network. Aspects of the present disclosure are directed to an ASA implementation. Still, the ASA technology is not limited to the illustrated configurations as other configurations are also contemplated. The ASA spectrum refers to portion(s) of a spectrum that is not used by a primary user and has been licensed for use by a secondary user, such as an ASA operator. ASA spectrum availability may be specified by location, frequency, and/or time. It should be noted that the authorized shared access may also be referred to as licensed shared access (LSA).

A PAL is an authorization to use a channel (e.g., an unpaired 10 MHz channel) in the 3.5 GHz range in a geographic service area for a period (e.g., 3 years). The PAL geographic service area may be census tracts, which typically align with the borders of political boundaries such as cities or counties. PAL licensees can aggregate up to four PA channels in any census tract at any given time, and may obtain licenses in any available census tract. PALs may provide interference protection for Tier 1 incumbent licensees and accept interference from them; however, PALs may be entitled to interference protection from GAA operators.

The third tier, GAA, permits access to bandwidth (e.g., 80 MHz) of the 3.5 GHz band that is not assigned to a higher tier (i.e., incumbent licensees or PALs). GAA may be licensed "by rule," meaning that entities that qualify to be FCC licensees may use FCC-authorized telecommunications equipment in the GAA band without having to obtain an individual spectrum license. GAA operators may receive no interference protection from PALs or Tier 1 operators, and may accept interference from them.

In order to facilitate the complex CBRS spectrum sharing process, a Spectrum Access System ("SAS"), which may be a highly automated frequency coordinator, can be used to assign frequencies in the 3.5 GHz band, for example, according to aspects presented herein. The SAS can also authorize and manage use of the CBRS spectrum, protect higher tier operations from interference, and maximize frequency capacity for all CBRS operators.

Example ASA Architecture

In one configuration, as shown in FIG. 11, an ASA architecture 1100 includes an ASA controller 1102 coupled to an incumbent network controller 1112 of a primary user and an ASA network manager 1114 of an ASA network. The primary user may be a primary ASA licensee and the ASA network may be a secondary user.

In one configuration, the incumbent network controller is a network entity operated by the primary user that controls and/or manages the network operating in the ASA spectrum. Furthermore, the ASA network manager may be a network entity operated by the ASA network operator that controls and/or manages an associated network, including but not limited to the devices operating in the ASA spectrum. Additionally, the secondary licensee may be a wireless network operator that has obtained an ASA license to use the ASA spectrum. Furthermore, in one configuration, the ASA controller is a network entity that receives information from the incumbent network controller on the available ASA spectrum that may be used by an ASA network. The ASA controller may also transmit control information to the ASA network manager to notify the ASA network manager of the available ASA spectrum.

In the present configuration, the incumbent network controller 1112 is aware of the use of the ASA spectrum by the primary user at specified times and/or locations. The incumbent network controller 1112 may provide information to the ASA controller 1102 for the incumbent usage of the ASA spectrum. There are several methods that the incumbent network controller 1112 can use to provide this information to the ASA controller 1102. In one configuration, the incumbent network controller 1112 provides a set of exclusion zones and/or exclusion times to the ASA controller 1102. In another configuration, the incumbent network controller 1112 specifies a threshold for allowed interference at a set of locations. The threshold for allowed interference may be referred to as incumbent protection information. In this configuration, the incumbent protection information is transmitted to the ASA controller 1102 over an ASA-1 interface 1116. Incumbent protection information may be stored by the ASA controller 1102 in a database 1106.

The ASA-1 interface refers to the interface between the primary user and the ASA controller. The ASA-2 interface refers to the interface between the ASA controller and the ASA network management system. Moreover, the ASA-3 interface refers to the interface between the ASA network manager and the ASA network elements. Furthermore, geographic sharing refers to an ASA sharing model in which the ASA network can operate throughout a geographic region for an extended period of time. The network is not permitted to operate in regions specified by exclusion zones.

The ASA controller 1102 uses the information from the incumbent network controller 1112 to determine the ASA spectrum that may be used by the ASA network. That is, the ASA controller 1102 determines the ASA spectrum that may be used for a specific time and/or a specific location based on rules specified in a rules database 1108. The rules database 1108 may be accessed by an ASA processor 1104 and stores the regulatory rules that are set by local regulations. These rules may not be modified by the ASA-1 or the ASA-2 interfaces, and may be updated by the individual or organization that manages the ASA controller 1102. The available ASA spectrum, as calculated by the rules in the rules database 1108, may be stored in the ASA spectrum availability database 1110.

The ASA controller 1102 may send information to the ASA network manager 1114 on the available ASA spectrum via an ASA-2 interface 1118, based on the spectrum availability database. The ASA network manager 1114 may know or determine the geographic location of base stations under its control and also information about the transmission characteristics of these base stations, such as transmit power and/or supported frequencies of operation. The ASA network manager 1114 may query the ASA controller 1102 to discover the available ASA spectrum in a given location or a geographic region. Also, the ASA controller 1102 may notify the ASA network manager 1114 of any updates to the ASA spectrum availability in real-time. This allows the ASA controller 1102 to notify the ASA network manager 1114 if the ASA spectrum is no longer available, so that the ASA network can stop using that spectrum and the incumbent network controller 1112 can obtain exclusive access to the ASA spectrum in real time.

The ASA network manager 1114 may be embedded in a standard network element, depending on the core network technology. For example, if the ASA network is a long term evolution (LTE) network, the ASA network manager can be embedded in an operations, administration, and maintenance (OAM) server.

Figure 12:
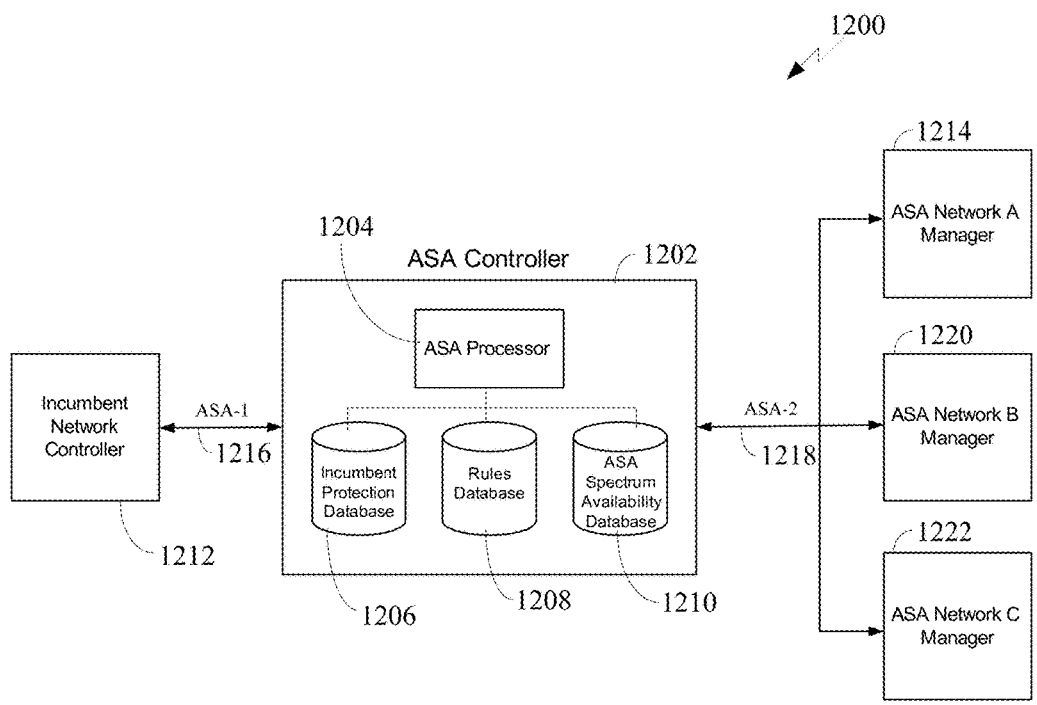
FIG. 12 is a block diagram showing aspects of an ASA controller coupled to different wireless communication systems including one primary user and multiple secondary users, in accordance with certain aspects of the disclosure.

In FIG. 11, an incumbent network controller and a single ASA network manager are illustrated as being coupled to the ASA controller. It is also possible for multiple ASA networks (e.g., ASA network A, ASA network B and ASA network C) to be connected to an ASA controller 1202, as in a system 1200 shown in FIG. 12. ASA network A includes an ASA network A manager 1214 coupled to the ASA controller 1202, ASA network B includes an ASA network B manager 1220 coupled to the ASA controller 1202, and ASA network C includes an ASA network C manager 1222 coupled to the ASA controller 1202.

In this example, the multiple ASA networks may share the same ASA spectrum. The ASA spectrum may be shared via various implementations. In one example, the ASA spectrum is shared for a given region, so that each network is restricted to a subband within the ASA spectrum. In another example, the ASA networks share the ASA spectrum by using timing synchronization and scheduling the channel access of the different networks.

The system 1200 may further include an incumbent network controller 1212 of a primary user communicating with the ASA controller 1202 via an ASA-1 interface 1216, to provide incumbent protection information for a database 1206. The ASA controller 1202 may include a processor 1204 coupled to a rules database 1208 and ASA spectrum availability database 1210. The ASA controller 1202 may communicate with the ASA network managers 1214, 1220 and 1222 via an ASA-2 interface 1218. The ASA networks A, B, C may be secondary users.

The ASA network manager(s) may interact with various network elements, such as eNodeBs, to achieve the desired spectrum use control. The interaction may be implemented via the ASA-3 interface between eNodeBs in the RAN and an ASA network manager node embedded in an operations, administration, and maintenance server. The RAN may be coupled to a core network. An ASA controller may be coupled to the operations, administration, and maintenance server via an ASA-2 interface and to a network controller of a primary user via an ASA-1 interface.

In some cases, multiple incumbent network controllers are specified for the same ASA spectrum. That is, a single incumbent network controller may provide information about incumbent protection for a given ASA frequency band. Therefore, the architecture may be limited to a single incumbent network controller. However, it is noted that multiple incumbent network controllers may be supported. Still, it may be desirable to limit the network to a single incumbent network controller.

Spectrum Sharing systems, such as SAS, allow for radio resources (e.g., operating frequency, transmission power limits, and geographic areas) to be assigned dynamically among multiple users and service providers while providing some degree of protection of other users/service providers and incumbent users that potentially have higher priority (e.g., fixed satellite systems, WISPs, and government/military systems).

Figure 13:
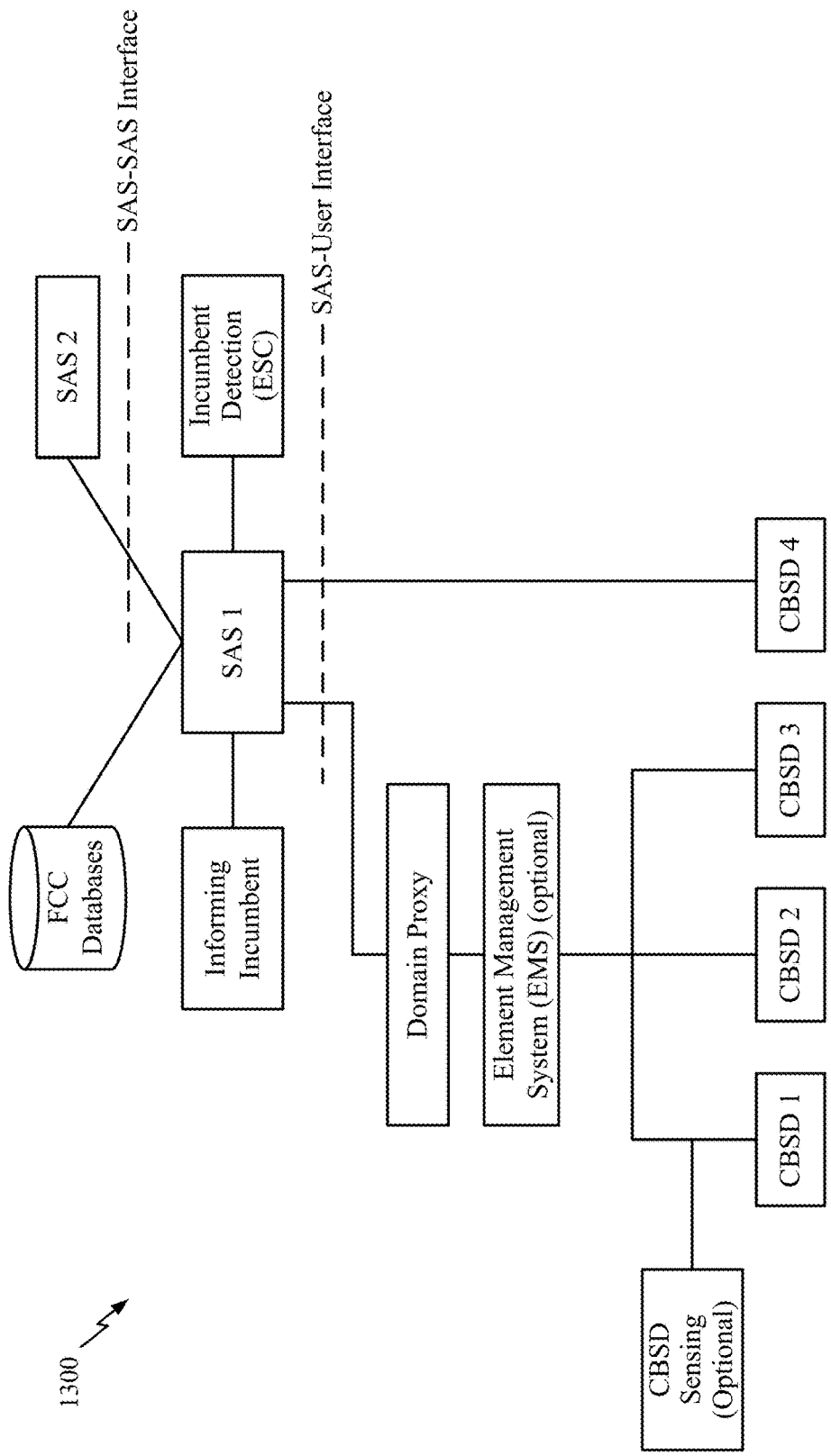
FIG. 13 illustrates an example architecture of a spectrum sharing system, in accordance with certain aspects of the disclosure.

FIG. 13 illustrates an example architecture 1300 of a spectrum sharing system. As illustrated, the spectrum sharing system may comprise one or more Spectrum Access Servers (SASs) (e.g., an ASA Controller) which are the entities that accept requests for radio resources from one or more Citizens Broadband Radio Service Devices (CBSDs), resolve conflicts or over-constraints in those requests, and grant the use of resources to radio access services.

When competing users and radio systems, (e.g., CBSDs) vie for radio resources, there is also a challenge of protecting these radio resources from each other based on restrictions due to the radio access technologies that are being used and a number of operational aspects for those radio access technologies. For example, some users/system operators may be able to coexist in the same or neighboring radio channels based on their use of the same (or compatible) radio technologies, compatible Self Organizing Network technologies, synchronized timing, common operational parameters (e.g., TDD slot structures, common radio silence intervals, etc.), and access to the same Core Networks for seamless mobility, etc. Accordingly, a SAS may determine channel assignments for different networks/system operators according to aspects presented herein.

Example Channel Assignment in Shared Spectrum Based on Network Coverage Overlap and Network Weights As noted above, in a multi-tier commercial radio service (e.g., such as citizens broadband radio service (CBRS)), different tiers of operators may be able to share portions of the same spectrum. In one reference example, different general authorized access (GAA) networks or technologies may be able to share different portions of the same bandwidth (e.g., one GAA network may be allocated 10 MHz and another GAA network may be allocated 10 MHz).

For GAA channel assignment among different networks in 3.5 GHz shared spectrum, a Spectrum Access Servers (SASs)/coexistence manager (CXM) can generate a network overlap graph. Each network may be represented by a node in the graph. Connections between nodes in the graph indicate that there is coverage overlap between the nodes. The SAS/CXM may then color the graph with minimum number of colors such that no two connected networks are assigned the same color. Each color represents a separate channel, and color of each network represents the channel assigned to the network.

In some cases, additional channels may be assigned to networks in the graph based on a weighting assigned to each network such that the assignment of channels does not create harmful interference to networks with overlapping coverage (e.g., networks connected by an edge in the network overlap graph). A network that is not connected to all of the colors represented in the graph may be assigned one or more additional channels. Networks that have overlapping coverage with fewer networks may have a higher likelihood of receiving an assignment of one or more additional channels.

FIG. 14 illustrates example operations that may be performed, for example, by an SAS/CXM to assign additional channels to one or more networks based on network coverage overlap and a weighting assigned to each network, according to aspects of the present disclosure. As illustrated, operations 1400 start at 1402, where the SAS/CXM determines whether channels are available for allocation at each network represented by a node in a network overlap graph. Each node in the graph may be associated with an assigned channel in a shared spectrum. As discussed above, a determination of whether channels are available for allocation at each network in the network overlap graph may be based on a number of connections between a network and overlapping networks. A network that is connected to a node of each color in the network overlap graph may not have any channels available for allocation, as assigning an additional channel to such a network may cause destructive interference to an overlapping network. A network that is not connected to a node of each color in the network overlap graph may be a cell that can be assigned one or more additional channels for communications.

At 1404, the SAS/CXM identifies channels that are available for allocation to the network and assigns at least one of the available channels to the network based, at least in part, on a weighting associated with the network for each of the networks in the graph for which channels are available for allocation. In some cases, the assignment may be performed on a "greedy" basis, where the SAS/CXM first assigns all of the available channels to the network having the highest weighting and proceeds with assigning available channels to networks with lesser weightings. In some cases, the assignment may be performed on a "round-robin" basis, where the SAS/CXM assigns a single channel to each network in the order in which the networks are weighted. When the SAS/CXM assigns a channel to the lowest-weighted network (or determines that no channels can be assigned to the lowest-weighted network), the SAS/CXM returns to the highest weighted network to attempt to assign another channel to the highest weighted network, as described in further detail below.

Figure 15:
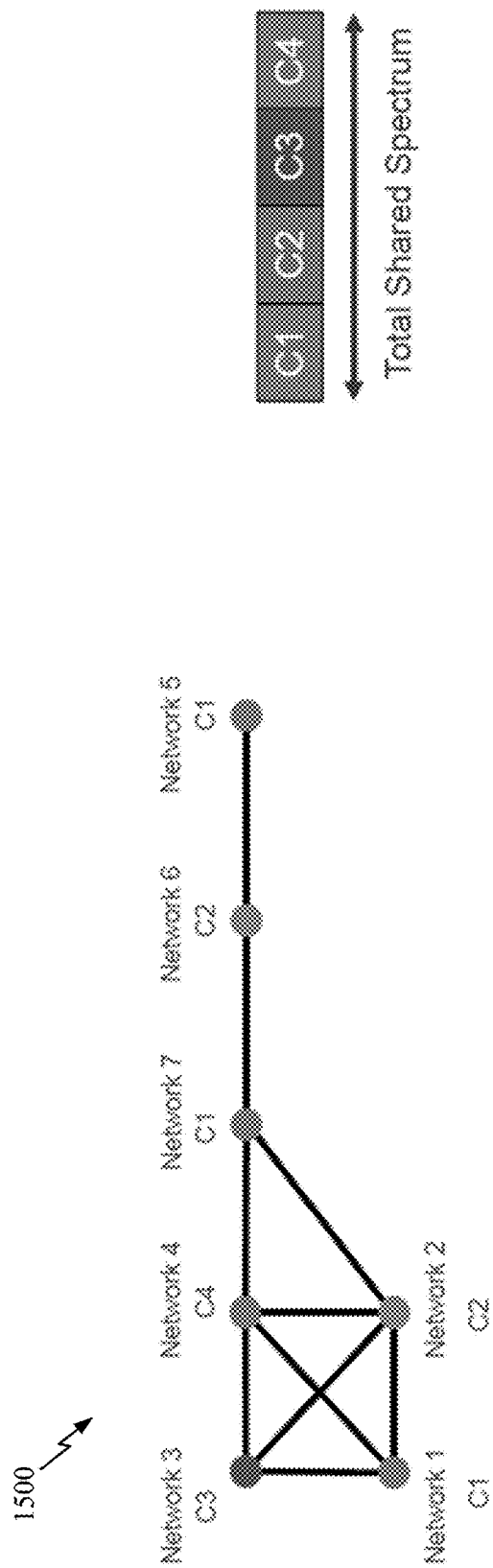
FIG. 15 illustrates an example network coverage graph, in accordance with certain aspects of the present disclosure.

FIG. 15 illustrates an example network overlap graph 1500, according to aspects of the present disclosure. As illustrated, each node in network overlap graph 1500 represents (or corresponds to) a network, and each node is colored according to a channel assigned to the network. Two networks are connected if there is a coverage overlap between the two networks. As illustrated in FIG. 15, due to the coverage overlap between networks 1, 2, 3, and 4, the minimum number of colors (channels) needed in the graph is four in order to avoid harmful interference, and an example graph coloring is illustrated in network overlap graph 1500 such that harmful interference is avoided.

Based on the network colorings in network overlap graph 1500, the SAS/CXM can determine that some networks in the network overlap graph may be assigned additional channels. For example, because networks 1, 2, 3, and 4 overlap with each other and each have a different color (e.g., edges connecting networks 1, 2, 3, and 4 exist in network overlap graph 1500), the SAS/CXM can determine that no additional channels can be assigned to any of networks 1, 2, 3, and 4. For network 5, which is connected in network overlap graph 1500 to network 6, the SAS/CXM can determine that network 5 can be assigned the additional channels represented by colors C3 and C4 (e.g., the channels identified in the network overlap graph as not being allocated to network 6). For network 6, which is connected to networks 5 and 7 (each having the same color), the SAS/CXM can determine that network 6 can be assigned additional channels represented by colors C3 and C4. However, if the SAS/CXM assigns one of these channels to network 5, the SAS/CXM may not assign the same channel to network 6, as such an assignment would cause destructive interference. For network 7, which is connected in network overlap graph 1500 to networks 2 and 4, the SAS/CXM can determine that network 7 can be assigned channel C3; however, if channel C3 is assigned to network 6, the SAS/CXM may not assign any additional channels to network 7 due to interference.

The weighting assigned to each network may represent (or indicate) a priority for obtaining additional resources (e.g., unused channels that do not interfere with channels used by overlapping networks) and may be used in determining an order in which networks are assigned additional channels. The weight may be determined, for example, based on a number of CBSDs (Citizen's Band Radio Devices) served by a network, a number of cells in a network, an amount of transmission power used by the network, interference created by the network to other networks (e.g., interference experienced by one network due to one or more other overlapping networks), network traffic loading, coverage area, and so on. After the SAS/CXM determines a weighting to assign to each network, the networks may be ordered such that networks with higher weightings are allocated additional channels before networks with lower weightings.

To assign available channels to networks in a network overlap graph, the SAS/CXM may use a "greedy" method. In a "greedy" method, the SAS/CXM assigns each network the carriers represented by colors the network is not connected to, and the assignment may be performed on higher weighted networks before being performed on lower weighted networks. In another example, the SAS/CXM may use a "round robin" method to assign available channels to networks in a network overlap graph. For example, the SAS/CXM can assign a single channel to each network per round of assignments. When no additional assignments can be performed, the SAS/CXM may end the assignment process. In some cases, the SAS/CXM can attempt to assign contiguous channels (adjacent channels to the existing assigned channels) to each network when possible.

In some cases, due to bandwidth quantization, additional channels may not be used in an initial graph coloring. For example, while the group of networks illustrated in FIG. 11 can be supported using four carrier colors, a total shared spectrum of 50 MHz among four carriers may result in the availability of an additional 10 MHz carrier that can be assigned to one or more networks in a radio access technology that uses 10 MHz or 15 MHz carriers.

Figure 16:
FIG. 16 illustrates example channel assignments to networks in a network coverage graph, in accordance with certain aspects of the present disclosure.

FIG. 16 illustrates example carrier assignments based on the "greedy" (option 1) and "round robin" (option 2) methods, according to an aspect of the present disclosure. The carrier assignments illustrated in FIG. 16 are based on the network overlap graph 1100 illustrated in FIG. 15. As illustrated, carrier assignments 1600 include an uncolored channel, C5, that is not included in network overlap graph 1500. Network 1 may be defined as the network with the highest weighting (priority), network 2 may have the next highest weighting, and so on (e.g., with network 7 having the lowest weighting). In both the "greedy" and "round robin" methods, network 1 may be assigned channel C5 as an additional channel, as network 1 has the highest weighting and overlaps with networks assigned channels C2, C3, and C4. Because network 1 may be assigned channel C5, networks 2, 3, and 4 may not be assigned any additional channels due to destructive interference.

In a "greedy" method, network 5 may be assigned channels C3, C4 and C5, which represent all of the channels that are available for assignment to network 5. Because network 5 has been assigned channels C3, C4 and C5, network 6 may not be assigned any additional channels because network 6 is assigned channel C2 and overlaps with a network assigned channels C1, C3, C4, and C5. Network 7, which is assigned channel C1 and overlaps with networks assigned channels C2 and C4, may be assigned channels C3 and C5.

In a "round robin" method, network 5 may be assigned a first channel out of channels C3, C4, and C5 during a first round of channel assignments. As illustrated, network 5 is assigned channel C3 in the first round of channel assignments, which allows network 6 to be assigned channel C4 in the first round of channel assignments. Network 7, like network 5, is assigned channel C3 in the first round. In the second round, because channel C4 is assigned to a network with overlapping coverage, networks 5 and 7 may be assigned channel C5, and the SAS/CXM may finalize a channel assignment process since no channels remain to be assigned in the network graph.

In some cases, the techniques discussed herein may be applied to channel assignment across radio access technologies (RATs). In some cases, the techniques discussed herein may be applied to channel assignment between eNodeBs in a network.

In some cases, the initial choice of network colorings in generating the network overlap graph may impact the assignment of additional colors (channels) to networks in the network overlap graph. Different assignments of colors (e.g., assignments of colors not based on a minimum number of colors in the graph) may be used to optimize channel assignments.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for coordinating spectrum access by a spectrum access system operating in a shared spectrum in which multiple wireless networks operate in portions of the shared spectrum, comprising:
   identifying a set of networks in a network overlap graph having one or more channels in the shared spectrum available for allocation, wherein:
      the shared spectrum comprises a plurality of channels divided into a plurality of ranked tiers, each tier being associated with a license authorizing primary usage of one or more channels within the tier and permissive usage of channels in other tiers subject to usage of the channels in the other tiers by networks associated with the other tiers and prioritized assignment of channels in higher tiers in the ranked tiers to operators having licenses to channels in the higher tiers,
      each network in the network overlap graph is represented by a node in the network overlap graph and is associated with an assigned channel in the shared spectrum and a tier in the shared spectrum, and
      connections between nodes in the network overlap graph represent coverage overlap between the connected nodes;
   for each network in the identified set of networks:
      identifying channels that are available for allocation to the network based on the tier associated with the network such that the network does not experience interference from lower tier networks operating in the shared spectrum and does not cause interference to higher tier networks operating in the shared spectrum, subject to usage of channels in higher tiers by the higher tier networks; and
      assigning at least one of the available channels to the network based, at least in part, on a weighting associated with the network, wherein:
         the weighting associated with the network represents a priority for the network to obtain additional channels in the shared spectrum and is determined based, at least in part, on a number of devices served by the network, a number of cells in the network, an amount of transmission power used by the network, traffic loading, or network coverage area;
         the assigning at least one of the channels to the network comprises one of:
            assigning each of the identified channels to the network having a highest weighting; or
            assigning a first channel of the at least one of the channels to the network having a highest weighting and after assigning a channel to each network for which channels are available for allocation based on a weighting assigned to each network, assigning a second channel of the at least one of the channels to the network having the highest weighting such that channels assigned to the network do not cause interference to an overlapping network.

2. The method of claim 1, wherein identifying the set of networks in a network overlap graph having one or more channels in the shared spectrum available for allocation comprises:
   identifying a channel used by a first network and channels used by overlapping networks; and determining a difference between the identified channels and a set of channels used in the graph.

3. The method of claim 2, wherein the graph comprises a plurality of edges connecting one or more nodes, and wherein an overlapping network is identified by an edge in the graph.

4. The method of claim 1, wherein the weighting indicates a priority assigned to the network for being assigned one or more additional channels.

5. The method of claim 4, wherein the weighting is based, at least in part, on an amount of traffic loading in the network.

6. The method of claim 4, wherein the weighting is based, at least in part, on a size of a coverage area associated with the network.

7. The method of claim 4, wherein the weighting is based, at least in part, on a transmit power used by cells in the network.

8. The method of claim 4, wherein the weighting is based, at least in part, on a number of devices connected to the network.

9. The method of claim 1, wherein the channels available for allocation include one or more channels that are not represented in the network overlap graph.

10. The method of claim 1, wherein the assigned channel and the at least one of the available channels comprise adjacent channels in the shared spectrum.

11. The method of claim 1, wherein the network overlap graph comprises a node for a first network operating on a first radio access technology and a node for a second network operating on a second radio access technology.

12. The method of claim 1, wherein nodes in the network overlap graph correspond to cells in a network.

13. An apparatus for coordinating spectrum access by a spectrum access system operating in a shared spectrum in which multiple wireless networks operate in portions of the shared spectrum, comprising:
   a processor configured to:
      identify a set of networks in a network overlap graph having one or more channels in the shared spectrum available for allocation, wherein:
         the shared spectrum comprises a plurality of channels divided into a plurality of ranked tiers, each tier being associated with a license authorizing primary usage of one or more channels within the tier and permissive usage of channels in other tiers subject to usage of the channels in the other tiers by networks associated with the other tiers and prioritized assignment of channels in higher tiers in the ranked tiers to operators having licenses to channels in the higher tiers,
         each network in the network overlap graph is represented by a node in the network overlap graph and is associated with an assigned channel in the shared spectrum and a tier in the shared spectrum, and connections between nodes in the network overlap graph represent coverage overlap between the connected nodes, for each network in the identified set of networks:
identify channels that are available for allocation to the network based on the tier associated with the network such that the network does not experience interference from lower tier networks operating in the shared spectrum and does not cause interference to higher tier networks operating in the shared spectrum, subject to usage of channels in higher tiers by the higher tier networks, and assigning at least one of the available channels to the network based, at least in part, on a weighting associated with the network, wherein:
the weighting associated with the network represents a priority for the network to obtain additional channels in the shared spectrum and is determined based, at least in part, on a number of devices served by the network, a number of cells in the network, an amount of transmission power used by the network, traffic loading, or network coverage area,
the assigning at least one of the channels to the network comprises one of:
assigning each of the identified channels to the network having a highest weighting, or
assigning a first channel of the at least one of the channels to the network having a highest weighting and after assigning a channel to each network for which channels are available for allocation based on a weighting assigned to each network, assigning a second channel of the at least one of the channels to the network having the highest weighting such that channels assigned to the network do not cause interference to an overlapping network; and a memory coupled to the processor.

14. The apparatus of claim 13, wherein identifying the set of networks in a network overlap graph having one or more channels in the shared spectrum available for allocation comprises:
identifying a channel used by a first network and channels used by overlapping networks; and
determining a difference between the identified channels and a set of channels used in the graph.

15. The apparatus of claim 14, wherein the graph comprises a plurality of edges connecting one or more nodes, and wherein an overlapping network is identified by an edge in the graph.

16. The apparatus of claim 13, wherein the weighting indicates a priority assigned to the network for being assigned one or more additional channels.

17. The apparatus of claim 16, wherein the weighting is based, at least in part, on an amount of traffic loading in the network.

18. The apparatus of claim 16, wherein the weighting is based, at least in part, on a size of a coverage area associated with the network.

19. The apparatus of claim 16, wherein the weighting is based, at least in part, on a transmit power used by cells in the network.

20. The apparatus of claim 16, wherein the weighting is based, at least in part, on a number of devices connected to the network.

21. The apparatus of claim 13, wherein the assigned channel and the at least one of the available channels comprise adjacent channels in the shared spectrum.

22. The apparatus of claim 13, wherein the network overlap graph comprises a node for a first network operating on a first radio access technology and a node for a second network operating on a second radio access technology.

23. The apparatus of claim 13, wherein nodes in the network overlap graph correspond to cells in a network.

24. An apparatus for coordinating spectrum access by a spectrum access system operating in a shared spectrum in which multiple wireless networks operate in portions of the shared spectrum, comprising:
means for identifying a set of networks in a network overlap graph having one or more channels in the shared spectrum available for allocation, wherein:
the shared spectrum comprises a plurality of channels divided into a plurality of ranked tiers, each tier being associated with a license authorizing primary usage of one or more channels within the tier and permissive usage of channels in other tiers subject to usage of the channels in the other tiers by networks associated with the other tiers and prioritized assignment of channels in higher tiers in the ranked tiers to operators having licenses to channels in the higher tiers,
each network in the network overlap graph is represented by a node in the network overlap graph and is associated with an assigned channel in the shared spectrum and a tier in the shared spectrum, and
connections between nodes in the network overlap graph represent coverage overlap between the connected nodes;

for each network in the identified set of networks:
means for identifying channels that are available for allocation to the network based on the tier associated with the network such that the network does not experience interference from lower tier networks operating in the shared spectrum and does not cause interference to higher tier networks operating in the shared spectrum, subject to usage of channels in higher tiers by the higher tier networks; and
means for assigning at least one of the available channels to the network based, at least in part, on a weighting associated with the network, wherein:
the weighting associated with the network represents a priority for the network to obtain additional channels in the shared spectrum and is determined based, at least in part, on a number of devices served by the network, a number of cells in the network, an amount of transmission power used by the network, traffic loading, or network coverage area;
the assigning at least one of the channels to the network comprises one of:
assigning each of the identified channels to the network having a highest weighting; or
assigning a first channel of the at least one of the channels to the network having a highest weighting and after assigning a channel to each network for which channels are available for allocation based on a weighting assigned to each network, assigning a second channel of the at least one of the channels to the network having the highest weighting such that channels assigned to the network do not cause interference to an overlapping network.

25. A non-statutory computer-readable medium having instructions stored thereon which, when executed by one or more processors, performs an operation for coordinating spectrum access by a spectrum access system operating in a shared spectrum in which multiple wireless networks operate in portions of the shared spectrum, the operation comprising:

identifying a set of networks in a network overlap graph having one or more channels in the shared spectrum available for allocation, wherein:

the shared spectrum comprises a plurality of channels divided into a plurality of ranked tiers, each tier being associated with a license authorizing primary usage of one or more channels within the tier and permissive usage of channels in other tiers subject to usage of the channels in the other tiers by networks associated with the other tiers and prioritized assignment of channels in higher tiers in the ranked tiers to operators having licenses to channels in the higher tiers, each network in the network overlap graph is represented by a node in the network overlap graph and is associated with an assigned channel in the shared spectrum and a tier in the shared spectrum, and connections between nodes in the network overlap graph represent coverage overlap between the connected nodes;

for each network in the identified set of networks:

identifying channels that are available for allocation to the network based on the tier associated with the network such that the network does not experience interference from lower tier networks operating in the shared spectrum and does not cause interference to higher tier networks operating in the shared spectrum, subject to usage of channels in higher tiers by the higher tier networks; and assigning at least one of the available channels to the network based, at least in part, on a weighting associated with the network, wherein:

the weighting associated with the network represents a priority for the network to obtain additional channels in the shared spectrum and is determined based, at least in part, on a number of devices served by the network, a number of cells in the network, an amount of transmission power used by the network, traffic loading, or network coverage area;

the assigning at least one of the channels to the network comprises one of:

assigning each of the identified channels to the network having a highest weighting; or assigning a first channel of the at least one of the channels to the network having a highest weighting and after assigning a channel to each network for which channels are available for allocation based on a weighting assigned to each network, assigning a second channel of the at least one of the channels to the network having the highest weighting such that channels assigned to the network do not cause interference to an overlapping network.

* * * * *